United States Statutory Invention Registration [19]

[11] Reg. Number: H1

Wattana-Chayakul [45] Published: Dec. 3, 1985

[54] SPLIT BARREL INSULATION DISPLACING CONNECTOR

[75] Inventor: Montri Wattana-Chayakul, Lake Hiawatha, N.J.

[73] Assignee: Bell Telephone Laboratories, Inc., Murray Hill, N.J.

[21] Appl. No.: 585,951

[22] Filed: Mar. 5, 1984

[51] Int. Cl.[4] ..... H01R 4/24

[52] U.S. Cl. ..... 339/97 P; 339/97 R; 339/99 R

[58] Field of Search ..... 339/97 R, 97 P, 98, 339/99 R

[56] References Cited

U.S. PATENT DOCUMENTS

| | | | |
|---|---|---|---|
| 3,112,147 | 11/1963 | Pferd et al. | 339/97 |
| 3,234,498 | 2/1966 | Logan | 339/97 |
| 3,394,454 | 7/1968 | Logan | 29/629 |
| 3,854,114 | 12/1974 | Kloth et al. | 339/97 R |
| 4,011,647 | 3/1977 | Peterson | 29/750 |
| 4,141,618 | 2/1979 | Reavis, Jr. et al. | 339/97 P |
| 4,261,633 | 4/1981 | Abernethy | 339/97 P |
| 4,283,105 | 8/1981 | Ferrill et al. | 339/97 R |
| 4,286,836 | 9/1981 | Rumps | 339/97 R |
| 4,333,700 | 6/1982 | Pugh, III | 339/97 R |

FOREIGN PATENT DOCUMENTS

| | | | |
|---|---|---|---|
| 79599 | 5/1983 | European Pat. Off. | 339/97 R |

*Primary Examiner*—David H. Brown
*Assistant Examiner*—John E. Griffiths
*Attorney, Agent, or Firm*—John F. Moran; Robert O. Nimtz; Patrick E. Roberts

[57] ABSTRACT

A split-barrel connector terminal is presented wherein a wire connected to the terminal is released as a new wire is being connected. This feature is provided by aperture (13) located a predetermined distance from the wire receiving end of slot (12). When insertion tool (51) forces wire (61) into slot (12), wire (52) is pushed into aperture (13) terminating its mechanical and electrical connection to terminal (11). Terminal (11) has locking shoulders (17) and (18) which permit insertion of the terminal into insulation sheet (32) but prevent removal of the terminal. Sheet (32) and sheet (33) are molded pieces which fit together to provide insulating housing structures for terminal (11). Slot (43) in the housing secures the wires connected to terminals (11) and provides a strain relief function. This arrangement reduces the number of parts making an otherwise complex assembly easily and economically manufacturable.

10 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TOOL
51
61
CUT
53
52
19
37
41
42
13
13
11
11
33
32
17
17
16
16

SPLIT BARREL INSULATION DISPLACING CONNECTOR

BACKGROUND OF THE INVENTION

This invention relates to electrical connectors and, more particularly, to a wire terminating arrangement using a split barrel terminal.

The so-called split barrel connector wherein the slot is longitudinally located in the barrel terminal is widely used since it offers a number of advantages. Among them are quick connect or insulation displacement convenience for easy use with reliability. High density packing is also featured as well as adaptability to modular construction.

Such conveniences translate into installation and maintenance cost savings particularly in a connecting block application for distributing frames in a telephone central office. The connecting block is used on a main distributing frame to provide a semipermanent cross-connection between a cable pair and a line terminal. Such cross-connections are being changed with ongoing frequency to provide constant rearrangement of the loop plant associated with a typical central office. Unfortunately, the convenience features of conventional connecting arrangements are centered around establishing connections, but in the usual case as connections are being established other connections are to be eliminated. Accordingly, a significant need exists for providing a convenient disconnect feature without compromising the convenience of establishing connections.

SUMMARY OF THE INVENTION

A split barrel terminal is configured to provide a wire release feature by locating an aperture a predetermined distance away from the wire receiving end of the longitudinal slot in terminal. As a wire is inserted in the longitudinal slot, a wire previously located in the slot slides into the aperture and is released and disconnected from the terminal.

In some of the further aspects of the invention, the area of the aperture exceeds the cross-sectional area of the wire including its insulation compatible with terminal. The barrel terminal includes locking shoulders which permit the terminal to be inserted in a hole and secure it from being removed from the hole. The barrel terminal has a tail portion configured for wire wrap connections. The electrical terminal is made of a phosphor bronze alloy, two sheetlike members, a base having an array of hole receiving terminals and a mating member both of insulation material, provide for a low-cost, readily assembled connecting block.

BRIEF DESCRIPTION OF THE DRAWING

These and other features of the invention will become apparent upon reading the detailed description in conjunction with the drawing.

In the drawing.

DETAILED DESCRIPTION

Figure 1:
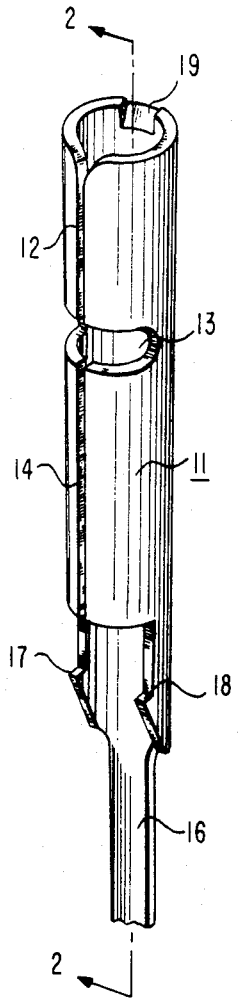
FIG. 1 is a perspective view of a barrel type connector constructed in accordance with the invention.

FIG. 1 is a perspective view of terminal 11 for providing the inventive features. The same reference numerals are used throughout the various drawings to identify the corresponding portions of the terminal to be described. Terminal 11 includes a wire accepting slot 12 which communicates with aperture 13. Remaining portion 14 of the slot is not actively used in the manner of slot 12 but is a by-product of the method of forming terminal 11 from a sheet of resilient, electrically conductive material. Located down from slot 14 are locking shoulders 17 and 18 whose function will be made clear later. The end of terminal 11 includes tail 16 designed for wire wrap terminating. At the other end of terminal 11, an optional wire cutting edge 19 is provided for removing wire ends when using terminal 11.

Figure 2:
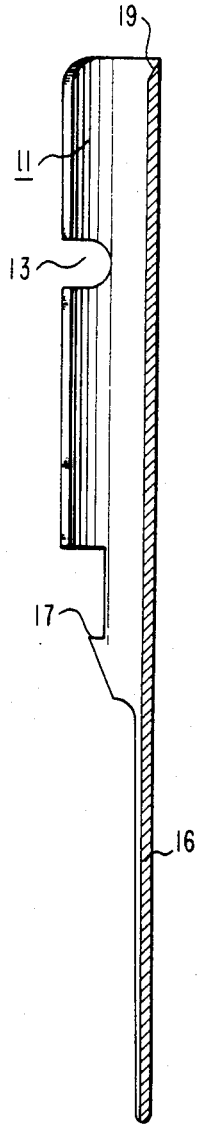
FIG. 2 is a cross-sectional view of terminal 11 taken along center line 2—2 in FIG. 1.

In FIG. 2, a cross-sectional view of terminal 11 is shown. It should be noted that the drawings are shown in expanded scale for the purposes of illustration. In this application, tail 16 is designed to accommodate a wire wrap connection. However, in other applications those skilled in the art may design this end portion of terminal 11 to take on any one of a variety of shapes to provide various mounting or connection arrangements.

Figure 3:
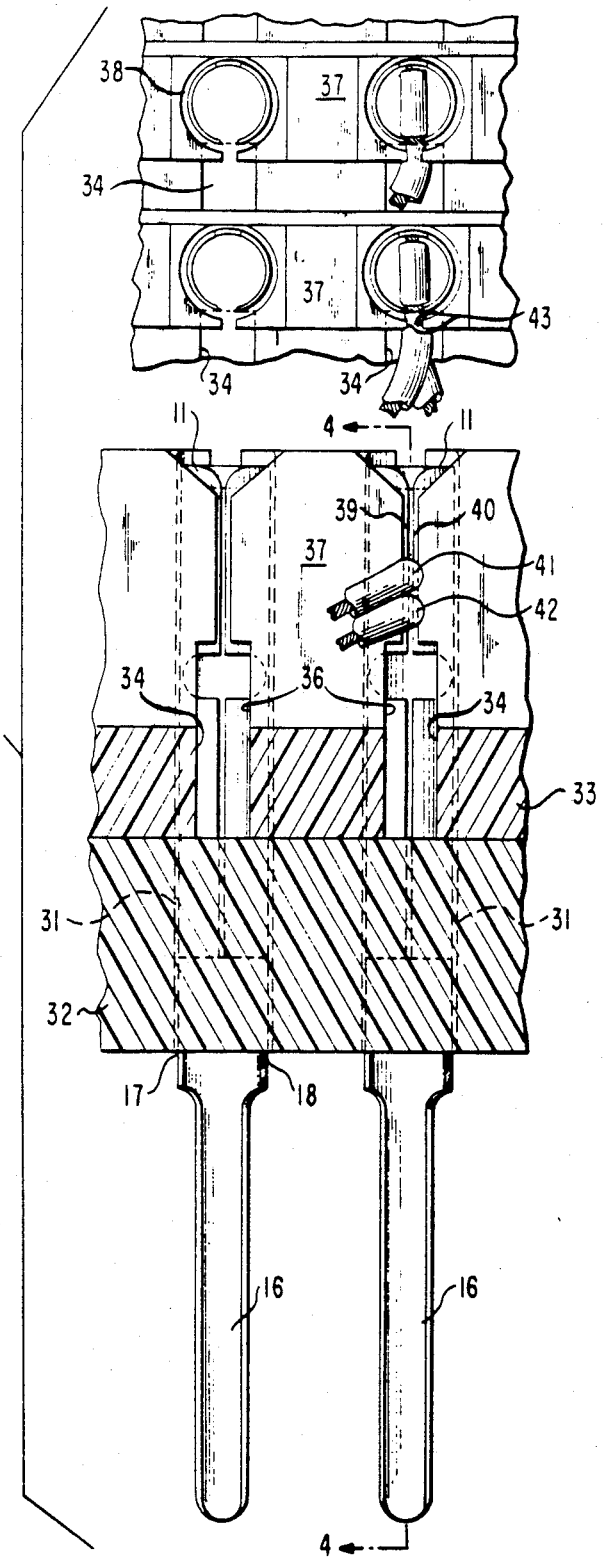
FIG. 3 is a cross-sectional view of a portion of an array of terminals 11 in a typical connector block.

In FIG. 3, a portion of a typical mounting application is illustrated, such as a sectional segment of a connecting block. Terminals 11 are each inserted with tail 16 first into each of holes 31 of a sheet of insulation material 32 which serves as a base. Terminal 11 is secured into position by locking shoulders 17 and 18. Locking shoulders 17 and 18 provide for easy insertion of terminals 11 into holes 31 but resist removal to provide the locking function. As can be appreciated from the upper portion of FIG. 3, a plurality of the terminals may be readily mounted in holes in a compact array pattern with closely spaced columns and rows to provide high terminal density.

Also present in FIG. 3 is another continuous sheet 33 of insulation material, which with a number of protrusions and holes, serves as a plurality of individual housing structures wherein one is for each individual terminal in an array of terminals 11. The location and orientation of holes and protrusions in sheet 33 are provided to facilitate its low-cost manufacture by an injection molding process. Adjacent to the base of slot 14 in each of terminals 11 is rectangular shaped hole 34 in sheet 33. Projecting above each of holes 34 is rectangular slot 36 which provides access to aperture 13 of terminal 11.

Extending from the base portion of sheet 33 are a series of wall-like protrusions 37. Each of protrusions 37 is located and extends upward to surround a row of terminals 11. At a location corresponding to each of terminals 11, one of holes 38 is positioned to accommodate the upper portion of a terminal. Hole 38 is slightly larger in diameter than terminal 11 to provide for expansion (diametrical expansion) attendant to accepting wires in slot 12. For example, wires 41 and 42 are bridged together by terminal 11 by being both slid into slot 12. Cross-sectional line 4—4 in FIG. 3 is used to provide the reference line for the section depicted in FIG. 4.

Figure 4:
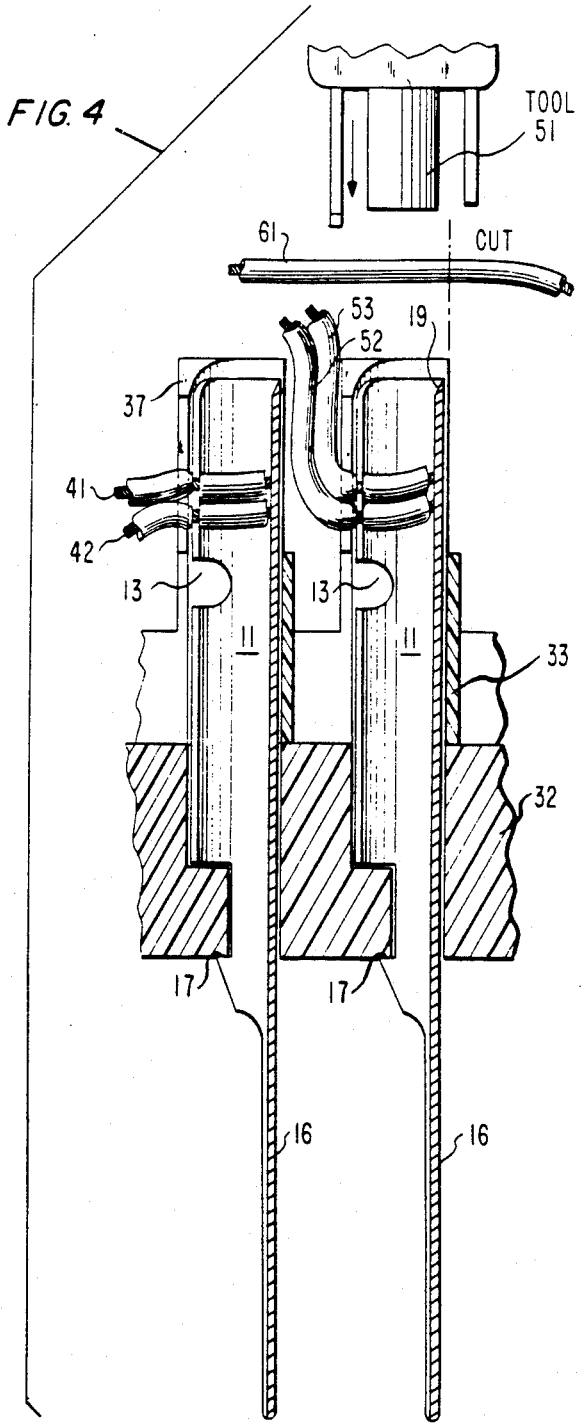
FIG. 4 is a cross-sectional view of the array of FIG. 3 taken along center line 4—4.

FIGS. 3 and 4 together illustrate the operational features provided by terminal 11. In order to use terminal 11 with a conductor in the form of insulated wire, tool 51 is used to force wire 52 into slot 12 at which point wire 52 is cut to size by cutting edge 19. Then, wire 52 gains admission into slot 12 wherein edge faces 40 and 39 (shown in FIG. 3 of terminal 11) penetrate the insulation to provide mechanical and electrical contact with the conductor of wire 52. As illustrated in FIGS. 3 and 4, slot 12 may easily accommodate two wires such as wires 41 and 42 or wires 52 and 53, to provide a bridging function. This is due to the presence of aperture 13 which encourages edge faces 40 and 39 to spread apart in parallel fashion so that wires 52 and 53 may be held concurrently in slot 12 to provide electrical connections therebetween via terminal 11. Suitable materials for terminal 11 may be phosphor bronze or beryllium copper alloys.

As illustrated in FIG. 4 when a third wire 61 is connected to terminal 11 using tool 51 both wires 52 and 53 slide further into slot 12 in the direction of tail 16. In other words terminal 11 will now accommodate wires 53 and 61 while wire 52 is automatically disconnected in the process of accepting wire 61. Another feature of operational characteristics of terminal 11 is that wire 53 may be removed by being simply pulled out of slot 12. However, removal of wire 52 which would normally require removal by pulling out wires 53 and 52 is automatically provided by the normal insertion of wire 61 into terminal 11. Hence, wire 53 is disturbed to the smallest possible extent when wire 61 is inserted and wire 52 is removed from terminal 11.

It should be noted that sheets 32 and 33 of insulation material form a sandwich type structure for connectors 11 in a connecting block. Sheets 32 and 33 are designed to be manufactured by molding. Locking shoulders 17 and 18 (only shoulder 17 is shown in FIG. 4) extend out over the lower surface of sheet 32 to secure terminal 11 after insertion into the sheet. With terminals 11 securely placed into holes 31, sheet 33 conveniently mates with the terminals. Each connecting block thus includes a minimum number of parts to facilitate low-cost assembly. When this structure is assembled, each individual terminal 11 is surrounded by an insulative housing which provides easy access to slot 12 in the terminal for conveniently connecting and disconnecting wires to the terminal.

Slot 43 in the housing which communicates with slot 12 in terminal 11 provides a strain relief function for preventing breakage of the wire in slot 12. Thus, the strain relief ensures a reliable long term contact of the wires to terminal 11. Due to the range of diametric expansion afforded by terminal 11, a single dimensional version of the terminal is compatible with a range of connecting wire gauges. For example, terminals in accordance with the invention readily accepted wire gauge sizes of No. 22, No. 24 and No. 26. Of course, those in the art may employ these inventive principles to advantage in terminals of other dimensions to work with a different range of wire gauge sizes.

It is to be understood that the foregoing product forms only one embodiment of the present invention, and numerous products may be derived from the foregoing described embodiment without departing from the spirit and scope of the invention. For example, in addition to changes made to accommodate other and different wire gauges including both solid and stranded conductor wire, the end of the terminal opposite to wire receiving slot may take on different forms for different applications of the invention. One example of a different form may include another wire receiving slot configuration. Of course, such modifications are a function of the application wherein the inventive principles are employed to advantage.

I claim:

1. An electrical contact having a cylindrical configuration, having first and second ends and having an open longitudinal wire receiving seam for receipt of two or more wires therein, the improvement comprising;

an aperture located in the receiving seam a predetermined distance from said first end of said contact and adapted to release at least one of said wires in the receiving seam as an additional wire is placed in the wire receiving seam.

2. The electrical contact of claim 1 wherein the area of the aperture is larger than a lateral cross-section of wire and its insulation, the wire being used to connect with the electrical contact.

3. The electrical contact of claim 2 further comprising a plurality of locking shoulders located between said first and second ends and nearer to said second end, said locking shoulders comprising sides sloping from said second end towards said first end so as to permit the insertion of said second end through a hole within a base, the locking shoulders adapted to secure said contact within said base after being inserted into said hole.

4. The electrical contact of claim 3 further comprising a tail portion extending below the locking shoulders, the tail portion having a geometry suitable for wire wrap connections.

5. The electrical contact of claim 3 wherein the material of said contact is a phosphor bronze alloy having suitable resilience.

6. A cylindrical electrical terminal of the type which receives wire and is adapted to displace electrical insulation on the wire to make electrical contact thereto, the terminal comprising:

an open longitudinal wire receiving seam for receipt of one or more wires therein at its mouth, an aperture located a predetermined distance from the mouth of the receiving seam and defining an area larger than a lateral cross-section of the wire including possible insulation, the aperture positioned to receive and to release the innermost wire from the receiving seam when an additional wire is placed in the receiving seam thereby limiting the wire capacity of the electrical terminal to a predetermined number of wires and releasing connected wires as new wires are engaged in the receiving seam of the electrical terminal.

7. A terminal of the insulation displacing type having a barrel configuration and a longitudinal slot with an entrance for accepting insulated wire to be connected to the terminal, the terminal comprising:

an aperture located to communicate with the longitudinal slot a prescribed distance from the entrance of the longitudinal slot and the aperture occupying an area exceeding the cross-sectional area of the wire including the insulation, the predetermined distance being at least long enough to accommodate the dimension occupied by two adjacent wires thereby providing the terminal with the ability to bridge together two wires, the aperture accepting the first of two wires when a third wire is placed in the slot thereby releasing the first wire from the terminal as a third wire is connected to the terminal.

8. A terminal in accordance with claim 7 further comprising:

a base of insulative material in a sheet having a first array of apertures, each aperture in the first array adapted to receive a terminal to form an array of terminals.

9. A terminal according to claim 8 further comprising a second sheet of insulation material with a second array of apertures corresponding to the first array, the second sheet having at least one wall-like protrusion aligned with a plurality of the apertures in the second array which extend therethrough, the second sheet adapted to be juxtapositioned with the base and the wall-like protrusion serving as insulating housing for the plurality of terminals inserted therein, each insulating housing having a slot which holds the wire and provides strain relief for preventing breakage of the wire due to flexing in the longitudinal slot.

10. A connector block assembly for split-barrel terminals said connector block having a layered structure comprising:

a base member having a plurality of apertures in a first array pattern, each aperture adapted to receive one of the split-barrel terminals, a second member formed from a sheet of insulation material having a plurality of second apertures in a second array pattern adapted to mate with the first array pattern in the base member, the second member having a plurality of wall-like protrusions extending from the second member, each protrusion aligned with one of said second apertures, the second member providing an insulating housing structure for the plurality of terminals with the wall-like protrusions.

* * * * *